June 7, 1932.  G. D. MALLORY  1,862,492

PNEUMATIC TIRE AND METHOD OF MAKING IT

Filed May 31, 1930

Inventor
Gerald D. Mallory
Bee + Bush
Attorneys

Patented June 7, 1932

1,862,492

UNITED STATES PATENT OFFICE

GERALD D. MALLORY, OF AKRON, OHIO, ASSIGNOR TO THE GOODYEAR TIRE & RUBBER COMPANY, OF AKRON, OHIO, A CORPORATION OF OHIO

PNEUMATIC TIRE AND METHOD OF MAKING IT

Application filed May 31, 1930. Serial No. 457,773.

This invention relates to pneumatic tires and methods of making them, and it has particular relation to a pneumatic tire having relatively small bead rings that are adapted to be mounted directly upon hub portions of aircraft landing gear, or other vehicles.

One object of the invention is to provide a tire in which rubberized cord fabric is evenly distributed in such manner as to prevent premature failure of the tread portion of the tire.

Another object of the invention is to provide a method of distributing cords of tire-building fabric in such manner as to avoid failure of the tire at the tread, without increasing the thickness thereof.

Figure 1:
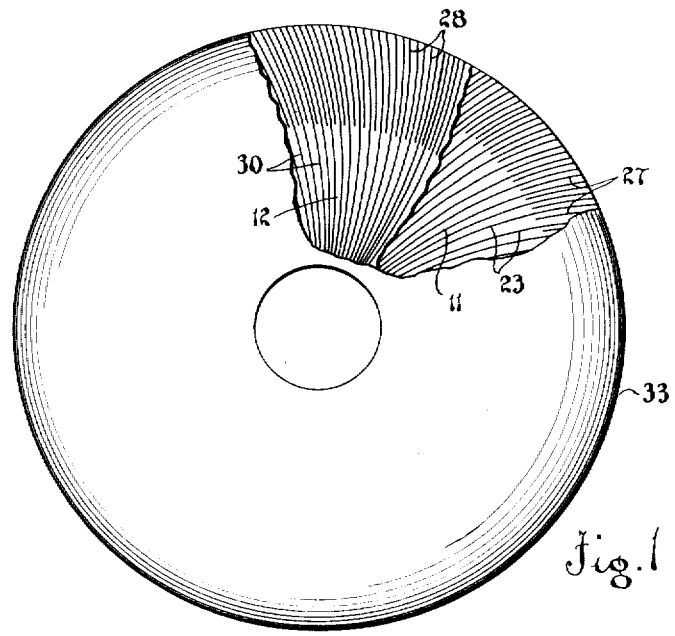
Figure 2:
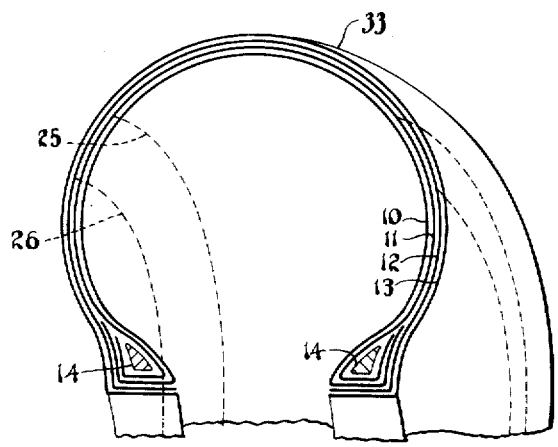
Figure 3:
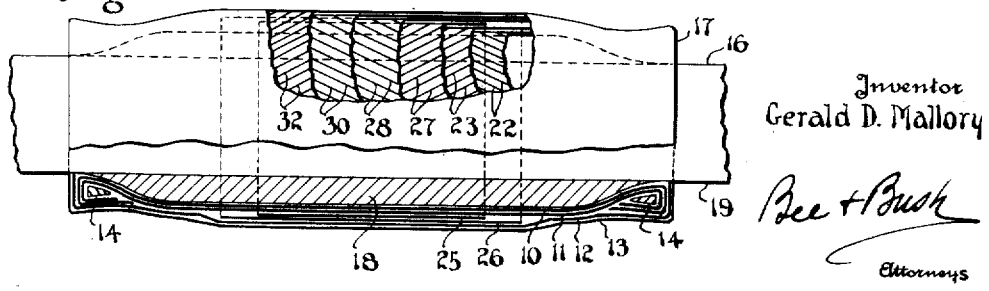

For a better understanding of the invention, reference may now be had to the accompanying drawing, forming a part of this specification, of which Figure 1 is a side elevational view of a tire constructed according to the invention, parts thereof being omitted for the sake of clearness;

Figure 2 is a fragmentary, perspective and cross-sectional view, showing diagrammatically the principal features of the tire; and Figure 3 is an elevation and cross-sectional view of a tire band mounted upon a cylindrical forming member, according to the invention.

In practising the invention, a plurality of rubberized cord fabric plies 10, 11, 12 and 13, having their edge portions lapped and secured about bead rings 14, are mounted upon a substantially cylindrical tire-building drum 16 to form a unitary tire band 17. A collapsible segmental portion 18 removably mounted upon a supporting portion 19 of the drum, directly receives the plies and it can be slipped from the cylindrical supporting portion. Thereafter, the band 17 is removed by collapsing the segmental portion 18.

After the first two plies 10 and 11 have been applied to the drum in such manner that their cords 22 and 23, respectively, are disposed diagonally of the band in opposite directions, additional relatively narrow plies 25 and 26 are superposed thereon. Cords 27 of the inner narrower ply 25 are arranged substantially parallel to the cords 23 of the ply 11, and cords 28 of the ply 26 are arranged transversely of the cords 27. Then the plies 12 and 13 are applied in such manner that cords 30 of the ply 12 are disposed substantially parallel to the cords 28 of the outer narrower ply 26, while the cords 32 of the outer ply 13 are arranged transversely of the cord 30. In order to insure more or less strengthening of the tire toward the outer periphery or tread thereof, the narrower plies 25 and 26 are selected of different widths, thus providing a stepped relation.

In shaping the cylindrical band 17, the center or tread portion is moved radially outwardly while the bead rings 14 are moved toward each other, and the final shaping of the band into a tire 33 is effected by vulcanizing or curing it in a mold having a cross-sectional shape corresponding to that shown by Figure 2. During this final shaping, heat and pressure applied to the tire forces the cords 27 of the ply 25 into interfitting relation between the cords 23 of the ply 11. As soon as the rubber in the tire becomes soft during the vulcanizing operation, the cords 27 are only slightly resisted in their movement toward a position between the cords 23, where they are disposed in substantially perfect parallel relation. Likewise, the cords 28 are forced into interfitting relation between the cords 30 of the ply 12. Thus the plies 11 and 25 are merged into a single ply having a large number of cords at the tread portion of the tire, and a relatively small number at the bead portion thereof. The same conditions are true with regard to the plies 12 and 26.

After the tire has been shaped in the manner described, it will be apparent that the cords at the bead portion of the tire are not crowded more than they were in the original band 17.

However, the tread portions of the plies 11 and 12 are greatly increased in diameter and accordingly, the cords of each ply are spaced considerably from each other, thereby providing sufficient space to receive the cords 27 and 28 therebetween. By practising this invention in the art of building tires of the type described, substantially the same type of drum or forming core can be employed as that employed in building ordinary so-called flat-built tires, with the exception that it is much longer axially. At the same time, excessive spacing of the cords is compensated by the introduction of additional interfitting cords which are not crowded about the beads of the tire.

Although I have described but the preferred forms which the invention may assume, and have described those forms in detail, it will be apparent to those skilled in the art that the invention is not so limited but that various modifications may be made therein without departing from the spirit of the invention or from the scope of the appended claims.

What I claim is:

1. A pneumatic tire comprising a plurality of plies of rubberized cord fabric, the cords at the tread portion of the tire in one of the plies being materially more numerous than the cords adjacent the bead portion of the tire in the same ply.

2. A pneumatic tire comprising a series of rubberized cords extending substantially diagonally from one side of the tire to the other, and shorter rubberized cords arranged between the cords of the first-mentioned series.

3. A pneumatic tire comprising a plurality of plies of rubberized cord fabric, the cords of each of a plurality of the plies being arranged in two series, the first series extending from one bead of the tire to the other, and the cords of the second series being spaced substantially equidistantly from the beads, the cords of the second series in each of a plurality of the plies being different in length from the cords of the second series in an adjacent ply.

4. A method of making tires which comprises superposing plies of rubberized cord fabric in substantially cylindrical form, shaping the plies into toroidal form, and interfitting cords of two adjacent plies to form a single ply during the shaping operation.

5. A method of making tires which comprises shaping a ply of cord fabric in substantially cylindrical form, superposing thereon a relatively narrower ply of cord fabric with its cords running in substantially parallel relation to an adjacent wider ply, and subsequently arranging the cords of the narrower ply between the cords of the wider ply to form a single ply including all of the cords.

In witness whereof, I have hereunto signed my name.

Signed at Akron, in the county of Summit and State of Ohio, U. S. A., this 28th day of May, 1930.

GERALD D. MALLORY.